United States Patent [19]

Schoenherr

[11] Patent Number: 4,618,642
[45] Date of Patent: Oct. 21, 1986

[54] SILICONE WATER-BASED CAULKING MATERIAL

[75] Inventor: Christine J. Schoenherr, Midland, Mich.

[73] Assignee: Dow Corning Corporation, Midland, Mich.

[21] Appl. No.: 729,835

[22] Filed: May 2, 1985

[51] Int. Cl.[4] .......................... C08G 77/16; C08K 3/26; C08K 3/22; C08L 83/08
[52] U.S. Cl. .................................... 524/425; 524/413; 524/430; 524/432; 524/500; 524/588; 524/783; 524/786; 524/788; 524/838
[58] Field of Search ............... 524/837, 838, 425, 500, 524/588, 413, 430, 432, 783, 786, 788

[56] References Cited

U.S. PATENT DOCUMENTS

| | | | |
|---|---|---|---|
| 3,355,406 | 11/1967 | Cekada | 260/29.2 |
| 3,706,695 | 12/1972 | Huebner | 117/226 |
| 4,100,124 | 7/1978 | Ichikawa et al. | 260/29.2 M |
| 4,288,356 | 9/1981 | Huebner et al. | 260/29.6 N R |
| 4,427,811 | 1/1984 | Elias et al. | 524/96 |
| 4,505,955 | 3/1985 | Meddaugh | 524/837 |
| 4,513,115 | 4/1985 | Beers | 524/425 |
| 4,535,109 | 8/1985 | Kondo | 524/837 |
| 4,552,919 | 11/1985 | Mikami | 524/425 |
| 4,554,187 | 11/1985 | Grape | 524/588 |
| 4,559,385 | 12/1985 | Huhn | 524/838 |
| 4,582,874 | 4/1986 | Grape | 524/588 |
| 4,585,849 | 4/1986 | Saykowski | 524/588 |
| 4,587,288 | 5/1986 | Maxson | 524/425 |

FOREIGN PATENT DOCUMENTS

| | | | |
|---|---|---|---|
| 862183 | 1/1971 | Canada | 400/45 |
| 57-57063 | 12/1982 | Japan . | |

Primary Examiner—C. Warren Ivy
Attorney, Agent, or Firm—Edward C. Elliott

[57] ABSTRACT

An aqueous silicone elastomeric emulsion is a storage stable, paste-type material useful as a caulking material. The caulking material is obtained by mixing an anionic emulsion containing dispersed particles of hydroxyl endblocked polydiorganosiloxane, dialkyltindicarboxylate, silane of the formula $RSi(OR')_3$ where R is a monovalent hydrocarbon radical of from 1 to 4 carbon atoms inclusive and R' is a lower alkyl radical of from 1 to 4 carbon atoms inclusive or a radical of the formula $-N=CR_2$, and inert, non-siliceous filler.

12 Claims, No Drawings

SILICONE WATER-BASED CAULKING MATERIAL

BACKGROUND OF THE INVENTION

1. Field of the Invention

This invention relates to a silicone water-based composition which is a storage stable, paste-type material that is useful as a caulking material.

2. Background Information

Silicone elastomeric emulsions having improved shelf life are taught by Elias and Freiberg in U.S. Pat. No. 4,427,811, issued Jan. 24, 1984. Their emulsion contains an anionically stabilized, hydroxyl endblocked polydiorganosiloxane, colloidal silica, and an alkyl tin salt. This mixture is aged for at least two weeks at room temperature, then filler other than colloidal silica is added. The emulsion can be used as a coating, or sufficient filler can be added to obtain a paste-type viscosity material useful as a caulking material. Experience has now shown that even using the method of their invention gives a product which slowly changes upon shelf aging. Particularly in regard to compositions useful as caulking materials, the slow change in properties of the emulsion causes a drop in the elongation of the cured elastomer produced by removing the water from the emulsion. A need was apparent for a composition useful as a caulking material which did not change in properties as rapidly as did the compositions of Elias and Freiberg.

Methods were known for producing silicone coating emulsions such as the cloth treating materials of Nelson, taught in Canadian Pat. No. 862,183, issued Jan. 26, 1971. His aqueous dispersion of liquid hydroxyl endblocked dimethylsiloxane polymer, a trifunctional or tetrafunctional alkylsilane, and siloxane condensation catalyst was useful in dilute emulsions as one-part or two-part compositions which were heated to cure the compositions. It is not feasible to heat compositions intended for use as caulking materials in most cases. Nelson teaches nothing concerning high solids content, filled compositions useful as caulking materials.

In U.S. Pat. No. 3,355,406, issued Nov. 28, 1967, Cekada teaches the use of silsesquioxane to reinforce silicone rubber latex. He teaches a latex containing a curable, essentially linear silicone polymer, preferably a hydroxy or alkoxy endblocked linear polymer having been prepared by emulsion polymerization, a cross-linking agent which is a trifunctional or tetrafunctional silane, preferably trialkoxysilane, and a catalyst. Included in the catalysts are dialkyltindiacylates. Cekada teaches nothing concerning compositions useful as caulking materials, nor does he indicate how shelf stable his emulsion may be.

An emulsion which is not storage stable is taught by Huebner in U.S. Pat. No. 3,706,695, issued Dec. 19, 1972, which describes a composition useful as an elastomeric electrically conductive coating. The method prepares a composition from an emulsified polydiorganosiloxane, carbon black, organometallic catalyst, and trifunctional silane.

A composition useful as a binder for making gaskets is taught by Ichikawa et al. in U.S. Pat. No. 4,100,124, issued July 11, 1978. Their composition, a mixture of hydroxyl endblocked polydiorganosiloxane, trialkoxysilane, organometallic catalyst, emulsifying agent, water and gasketing material is made into a sheet, compressed, dried, and thermally cured.

Huebner et al. teach a method of blending an aqueous emulsion of hydroxyl endblocked polydiorganosiloxane and an aqueous emulsion of copolymer of unsaturated organic monomer and unsaturated organosilicon monomer with an alkyl tin salt and a silane crosslinking agent in U.S. Pat. No. 4,288,356, issued Sept. 8, 1981. The product obtained by devolatilizing the blended emulsions is an elastomer useful as a coating, a textile treatment, and a paper treatment. They teach that if the copolymer emulsion is not present, the final product is a soft, sticky, polydiorganosiloxane gum which is not useful as an elastomeric product.

Another composition which cures to an elastomer upon removal of water is disclosed in Japanese Publication 57-57063, published Dec. 2, 1982, laid open to public inspection Nov. 15, 1978. The composition, composed of hydroxyl terminated diorganosiloxane, silane containing at least 3 silicon-bonded hydrolyzable groups, curing catalyst such as metal salt of organic acids, emulsifier, and water, is stated to be storage stable as a one-part emulsion which rapidly converts to an elastomer upon drying. The composition is useful as a coating agent or fiber processing agent. There is no suggestion that the composition is useful with fillers.

Experience shows a need for a composition useful as a caulking material that has improved shelf life. The above prior art shows conflicting results when an emulsion is prepared from hydroxyl endblocked polydiorganosiloxane, trifunctional or tetrafunctional alkylsilane, and siloxane condensation catalyst. Nelson teaches heat cure as does Ichikawa et al., while Huebner et al. and Japanese 57-57063 teach cure at room temperature. Huebner et al. '356 teach a soft, sticky gum is obtained without their copolymer, while Japanese 57-57063 shows an elastomer was obtained. Japanese 57-57063 also teaches that less than 50 parts by weight of water per 100 parts by weight of polymer is not recommended. None of the above references shows compositions useful as caulking materials which are based upon the use of hydroxyl endblocked polydiorganosiloxane, alkyl trialkoxysilane, dialkyltindicarboxylate, and non-siliceous filler.

SUMMARY OF THE INVENTION

A composition consisting essentially of an emulsion of hydroxyl endblocked polydiorganosiloxane, dialkyltindicarboxylate, alkyltrialkoxysilane, and inert, non-siliceous filler is produced. The composition has a paste-type viscosity, is stable on storage, and produces an elastomeric product upon removal of the water at room temperature. The composition is a useful caulking material.

It is an object of this invention to produce a silicone composition which is an aqueous emulsion having a viscosity such that the composition is useful as a caulking material.

It is an object of this invention to produce a silicone composition which is storage stable so that the properties of the elastomer produced by drying the composition at room temperature do not vary appreciably regardless of how long the composition is stored before drying.

It is an object of this invention to produce a storage stable caulking material with improved adhesion to substrates.

DESCRIPTION OF THE INVENTION

This invention is directed to a silicone composition consisting essentially of the aqueous emulsion obtained by mixing (A) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms per radical or 2-(perfluoroalkyl)ethyl radicals having less than 7 carbon atoms per radical, present as an emulsion of dispersed particles in water, the emulsion having a pH of greater than 9 and a solids content of greater than 50% by weight, (B) from 0.075 to 0.75 part by weight of dialkyltindicarboxylate, (C) from 0.2 to 5 parts by weight of silane of the formula $RSi(OR')_3$ where R is a monovalent hydrocarbon radical of from 1 to 4 carbon atoms inclusive and R' is a lower alkyl radical of from 1 to 4 carbon atoms inclusive or a radical of the formula $—N=CR_2$ where R is as defined above, and (D) from 50 to 200 parts by weight of inert, non-siliceous filler, to produce a paste-type emulsion having a total solids content of greater than 70% by weight and being useful as caulking material that cures upon removal of the water to an elastomer.

The silicone composition of this invention is an aqueous emulsion having a viscosity such that it is a paste-type material. The silicone composition has this viscosity limitation because it is intended to be used as a caulking material useful in filling cracks and spaces in vertical, overhead, and horizontal surfaces. Silicone emulsions useful as caulking materials are known, but they are deficient in their shelf stability. The physical properties, of the elastomer produced upon drying prior compositions, change depending upon how long the emulsion has been stored before the elastomer is formed by drying the emulsion. The elastomer produced from emulsions of this invention show less change upon aging of the emulsion.

For purposes of this invention, a paste-type material is defined as a material which is hard enough to give a flow of from 0 to 2.54 cm when measured in accordance with ASTM D 2202 and soft enough so that the extrusion rate is greater than 50 grams per minute at a pressure of 0.62 MPa using a 3.18 mm orifice when measured in accordance with Military Specification MIL-S-88020. A preferred material has a flow of from 0 to 0.8 cm. If the silicone composition is intended for use in vertical or overhead locations, it is preferable that the flow be in this range so that the composition remains in place when extruded and tooled. If the composition is intended only for use in horizontal locations, such as highway joints for example, it is preferred that there be some flow, from 2 mm to 2 cm for example, so that the composition flows and wets the sides of the opening being sealed so that a good bond is obtained.

Because caulking material is commonly stored in a tube and extruded through a nozzle as it is used, the silicone composition has an extrusion rate of greater than 50 grams per minute. The preferred flow rate for compositions of this invention is greater than 500 grams per minute under the above test conditions. Embodiments of this invention can be easily prepared which have both a low flow and a high extrusion rate. This is distinctly different than caulking materials based upon silicone elastomers which are not in emulsion form.

The anionically stabilized, hydroxyl endblocked polydiorganosiloxane used in this invention is now well-known in the art. The hydroxyl endblocked polydioganosiloxane (A) is one which can be emulsified, which imparts elastomeric properties to the product obtained after the removal of the water from the emulsion, and which is anionically stabilized. Tensile strengths and elongations at break improve with increasing weight average molecular weight(Mw), with suitable tensile strengths and elongations obtained above 50,000 Mw. The maximum weight average molecular weight is one which can be emulsified and which will give elastomeric properties to the product obtained after the water is removed from the emulsion. Weight average molecular weights up to about 1,000,000 for the hydroxyl endblocked polydiorganosiloxane are expected to be practical for this invention. The preferred Mw for the hydroxyl endblocked polydiorganosiloxanes are in the range of 200,000 to 700,000.

The organic radicals of the hydroxyl endblocked polydiorganosiloxane can be monovalent hydrocarbon radicals containing less than seven carbon atoms per radical or 2-(perfluoroalkyl)ethyl radicals including 3,3,3-trifluoropropyl and 2-(perfluorobutyl)ethyl. The hydroxyl endblocked polydiorganosiloxanes preferably contain organic radicals in which at least 50 percent are methyl. The hydroxyl endblocked polydiorganosiloxanes are essentially linear polymers containing two organic groups per silicon atom but may include trace amounts of monoorganosiloxane or triorganosiloxy units present as impurities of the manufacturing process. The preferred hydroxyl endblocked polydiorganosiloxanes are the hydroxyl endblocked polydimethylsiloxanes.

The preferred anionically stabilized, hydroxyl endblocked polydiorganosiloxanes are those prepared by the method of anionic emulsion polymerization described by Findlay et al. in U.S. Pat. No. 3,294,725, issued Dec. 27, 1966, which is hereby incorporated by reference to show the methods of polymerization, the ingredients used, and the hydroxyl endblocked polydiorganosiloxane obtained in an emulsion. Another method of preparing the anionically stabilized, hydroxyl endblocked polydiorganosiloxane is described by Hyde et al. in U.S. Pat. No. 2,891,920, issued June 23, 1959, which is hereby incorporated by reference to show the hydroxyl endblocked polydiorganosiloxanes, the ingredients used, and their method of preparation. These methods and others are known in the art. The hydroxyl endblocked polydiorganosiloxanes used in this invention are those which are anionically stabilized. For the purpose of this invention "anionically stabilized" means the hydroxyl endblocked polydiorganosiloxane is stabilized in emulsion with an anionic surfactant. This silicone emulsion is in the form of an oil-in-water emulsion, i.e., the polydiorganosiloxane is a dispersed phase of particles in a continuous phase of water.

Ingredient (B) is dialkyltindicarboxylate. The dialkyltindicarboxylates are commercial materials. Preferred dialkyltindicarboxylates include dibutyltindiacetate, dibutyltindilaurate, and dioctyltindilaurate with dioctyltindilaurate most preferred. The dialkyltindicarboxylate can be used as is or it can be made into an emulsion. A suitable emulsion is produced by emulsifying 50 percent by weight of the dialkyltindicarboxylate with water using about 10 percent by weight of sodium alkylarylpolyether sulfonate as the emulsifying agent in any of the well known methods of producing oil-in-water emulsions.

Ingredient (C) is a silane of the formula $RSi(OR')_3$ where R is a monovalent hydrocarbon radical of from 1 to 4 carbon atoms inclusive and R' is a lower alkyl radical of from 1 to 4 carbon atoms inclusive or a radical of the formula $—N\!\!=\!\!CR_2$ where R is as defined above. R can be a saturated hydrocarbon radical, such as methyl, ethyl, propyl, or butyl; or an unsaturated hydrocarbon radical such as vinyl. Preferred R radicals are methyl and vinyl. R' is methyl, ethyl, propyl, butyl, or a radical of the formula $—N\!\!=\!\!CR_2$ where R is as defined above. Preferred silanes are methyltrimethoxysilane, vinyltrimethoxysilane, and methyltri(ethylmethyloxime)silane.

Ingredient (D) is an inert, non-siliceous filler. The filler is non-siliceous because the combination of ingredients (A) and (B) with a siliceous filler in an emulsion at a pH of greater than 9 will produce a reaction which appears to gradually crosslink the polymer, i.e., the modulus of the elastomer produced by drying the emulsion will gradually increase as the emulsion is aged. This is the effect which is greatly diminished by composition of this invention. Inert fillers suitable for use in anionic silicone emulsions are well-known. The fillers have an average particle size below 10 micrometers, preferably below 2 micrometers. Examples of fillers include carbon blacks, titanium dioxide, clays, aluminum oxide, calcium carbonate, zinc oxide, mica, and various pigments. Titanium oxide has been found to be particularly useful as an ultraviolet light screening agent. Calcium carbonate is a preferred filler for the caulking materials of this invention, particularly when it has average particle size of less than 1 micrometer.

Ingredient (E) is added to the storage stable silicone composition when improved adhesion to substrates is desired. Ingredient (E) is of the formula $QR_aSi(OR')_{3-a}$ where Q is an amine functional group, R is an alkyl group of from 1 to 4 carbon atoms, R' is as defined above, and a is 0 or 1. The amine functional group, Q, is selected from the group consisting of $R_b^2H_{2-b}NR^3—$ and $R_b^2H_{2-b}N(CH_2)_2NHR^3—$ in which $R^2$ is a monovalent hydrocarbon radical of from 1 to 10 carbon atoms, $R^3$ is $—(CH_2)_3—$ or $CH_2CH(CH_3)CH_2—$, and b is an integer from 0 to 2. Preferably b is 0 and $R^3$ is $—(CH_2)_3—$. Examples of useful silanes are 3-(2-aminoethylamino)propyltrimethoxysilane, aminopropyltriethoxysilane, 3-(2-aminoethylamino)butyl(methyl)dimethoxysilane, and 2-methyl-3-(2-aminoethylamino)propyl(methyl)dimethoxysilane. The preferred silanes are of the formulas $H_2NCH_2CH_2NH(CH_2)_3Si(OCH_3)_3$ identified as 3-(2-aminoethylamino)propyltrimethoxysilane and 2-methyl-3-(2-aminoethylamino)propyl(methyl)dimethoxysilane $-(CH_3O)_2(CH_3)SiCH_2(CH_3)CHCH_2—NH—(CH_2)_2NH_2$. Even though this ingredient (E) can be a trialkoxysilane as is ingredient (C), they are not interchangeable in their use. Ingredient (C) is a useful crosslinker in this composition but does not provide adhesion to a substrate as does ingredient (E). Ingredient (E) provides improved adhesion to a substrate, but is not a useful crosslinker as is ingredient (C).

The amounts of ingredients used are influenced, to some extent, by the requirements that the composition be of a paste-type viscosity as well as have a total solids content of greater than 70 percent by weight. If the emulsion of (A) has a solids content near the lower limit of 50 percent by weight, the amount of filler (D) that must be added to obtain greater than 70 percent by weight solids content in the silicone composition must be near the upper limit of the filler content. A large amount of filler or filler of very small particle size would also be required in order to obtain a paste-type viscosity. Preferably the solids content of the emulsion of (A) is about 60 percent by weight or higher. The solids content is determined by placing about 2 grams of material in an aluminum foil dish, heating for 1 hour in an air-circulating oven at 150° C., reweighing, and calculating the weight percent of material remaining.

The composition of this invention is based upon 100 parts by weight of polydiorganosiloxane in the emulsion of (A). From 0.075 to 0.75 part by weight of dialkyltindicarboxylate (B) is used to catalyze the cure of the composition. From 0.2 to 0.4 part by weight of the dialkyltindicarboxylate is preferred. The amount of silane (C) can be varied from 0.2 to 5 parts by weight with a preferred range of from 0.4 to 2 parts by weight.

The amount of filler can vary from 50 to 200 parts by weight. The amount used is determined by the solids content of the emulsion of (A) and the nature of the filler or mixture of fillers chosen. Sufficient filler is used so that the final composition is of the required paste-type viscosity and has the characteristics described above which allow its use as a caulking material. If too little filler is used, the composition will not have a high enough viscosity. If too much filler is used, the material will be too stiff to extrude properly from the storage container, or the cured composition will be too brittle. If the ratio of filler to polydiorganosiloxane is too high, the cured product will not be elastomeric. Preferred are amounts of from 125 to 175 parts by weight. Because these characteristics of the composition depend upon what type of filler or filler mixture is chosen and the particle size of the filler, it is necessary to perform a simple set of experiments using the ingredients chosen to determine the preferred amount of filler. It has been determined that when the emulsion of (A) contains about 60 percent by weight of polydimethylsiloxane, having a weight average molecular weight of about 325,000, the preferred amount of calcium carbonate filler, having an average particle diameter of about 0.7 micrometers, is in the range of from 150 to 165 parts by weight per 100 parts by weight of polydimethylsiloxane.

When improved adhesion to the substrate is desired, ingredient (E), the amino functional alkoxysilane, is added in an amount of from 0.05 to 0.25 parts by weight. The preferred amount is from 0.05 to 0.125 part by weight as this amount has been found to give greatly improved adhesion to substrates while showing less loss of elongation and longer shelf life. Use of larger amounts of (E) in conjunction with (C) results in cured caulking material having much higher durometer and reduced elongation.

The silicone compositions of this invention are prepared by ordinary high intensity mixing of the ingredients until a uniform material is obtained. The emulsion of (A) is placed in the mixer, ingredients (B) and (C) are added and mixed, then the filler (D) is slowly added with mixing so that it is uniformly dispersed. Because the final mixture is of a paste-type viscosity, the equipment must be strong enough to properly mix the ingredients at this viscosity. In the laboratory, a stainless steel container is used with a propeller-type, air-driven mixer. It is not desirable to build up heat during the mixing process. If necessary, the emulsion can be cooled before the filler is mixed in. After a uniform paste is obtained, the mixture is placed under vacuum or centrifuged to remove air entrapped during the mixing process. The deaired mixture is then placed into a sealed storage container.

When ingredient (E) is added to obtain improved adhesion to substrates, it is mixed in before the filler is added. Preferably (C) is mixed into (A), then (E) is added and mixed. Next (B) is mixed in and finally (D) is added.

Additional ingredients which can be added to the composition include such things as antifoams to aid during the mixing process, freeze-thaw stabilizers such as glycols to protect the composition if it is accidentally frozen during storage, stabilizers such as organic amines, preferably 2-amino-2-methyl-1-propanol, and pigments such as titanium dioxide and carbon black to provide opaqueness or color to the cured caulking material.

The silicone composition of this invention is particularly useful as a caulking material. It can be easily extruded from a storage tube into place. Because it is an aqueous emulsion, it is easily tooled if necessary. Tools can be cleaned by washing with water. During cure of the emulsion, primarily water is given off so that there is no problem with odor.

The following examples are included for illustrative purposes only and should not be construed as limiting the invention which is properly set forth in the appended claims.

All parts are by weight.

EXAMPLE 1

A series of emulsions were prepared which were a paste viscosity such that they were well suited for use as caulking materials.

An emulsion polymerized, hydroxyl endblocked polydimethylsiloxane having a weight average molecular weight of about 325,000 was first prepared. A mixture of 54 parts of water, 100 parts of low molecular weight, linear, hydroxyl-endblocked polydimethylsiloxane fluid and 4 parts of surfactant consisting of 30% by weight sodium lauryl sulfate was homogenized, then mixed with one part of dodecylbenzene sulfonic acid and allowed to polymerize. After polymerization, the emulsion was made basic by adding 0.5 part of 50% aqueous diethylamine. The emulsion had a pH of approximately 10 and a solids content of about 60% by weight.

A caulking material was prepared by mixing 150 parts of the above emulsion, 1.48 parts of vinyltrimethoxysilane, 0.44 parts of a 50% aqueous emulsion of dioctyltindilaurate, and 144 parts of finely ground calcium carbonate having an average particle size of about 0.7 micrometers. The caulking material was of a paste consistency having a solids content of about 80 percent by weight. Approximately 5 weeks after the caulking material was prepared and placed in a polyethylene cartridge, a sample of the caulking material was spread out on a polyethylene coated paper sheet and allowed to dry for 12 days at 23° C., 50% relative humidity. The resulting elastomer was then measured for properties according to ASTM D 2240 for durometer, ASTM D 412 for tensile strength, elongation, and tensile modulus. The results are shown in Table I. After 3 months and 8 months aging of the caulking material portions were formed into sheets, dried and tested as above with the results shown in Table I.

TABLE I

|  | Aging Time | Tensile Strength MPa | Elongation % | 100% Modulus MPa | Durometer |
|---|---|---|---|---|---|
| Exp. 1 | 5 weeks | 0.99 | 1270 | 0.20 | 11 |
|  | 3 months | 0.77 | 1028 | 0.20 | 10 |
|  | 8 months | 0.69 | 820 | 0.27 | 14 |
| Exp. 2 | 5 weeks | 0.76 | 1267 | 0.20 | 12 |
|  | 7.5 months | 0.82 | 816 | 0.33 | 19 |
| Exp. 3 | 5 weeks | 0.93 | 1333 | 0.21 | 11 |
|  | 6 months | 0.81 | 734 | 0.45 | 23 |

EXAMPLE 2

A caulking material was prepared as in Example 1, but 133 parts of the filler was used rather than the 144 parts of Example 1. When tested immediately after mixing, the caulking material did not cure upon drying. After 6 days shelf age, it cured upon drying. The caulking material was prepared and tested as in Example 1. Additional samples were prepared and tested after aging the caulking material for 7.5 months. The results are shown in Table I.

EXAMPLE 3

A caulking material was prepared as in Example 1, but contained 141 parts of the filler rather than the 144 parts of Example 1. The caulking material also contained 0.26 parts of an antifoam and 0.1 part of 2-amino-2-methyl-1-propanol. When dried immediately after mixing, it did not cure. When dried 3 weeks after mixing, it cured. This caulking material was prepared and tested as in Example 1. Additional samples were prepared and tested after aging the caulking material for 6 months. The results are shown in Table I.

EXAMPLE 4

A series of caulking materials were prepared by mixing 150 parts of the polydimethylsiloxane emulsion of Example 1, 0.26 part of an antifoam, the parts of either vinyltrimethoxysilane or methyltrimethoxysilane shown in Table II, the amount of 50% aqueous emulsion of dioctyltindilaurate shown in Table II, and the amount of adhesion additive, 3-(2-aminoethylamino)-propyltrimethoxysilane, shown in Table II. After these were uniformly mixed, 141 parts of the finely ground calcium carbonate of Example 1 was mixed in and stirred at high speed for 8 minutes until the filler was thoroughly wet out and the mixture was uniform. The mixture was of a paste viscosity.

Samples of each mixture were spread into a sheet immediately after mixing and allowed to dry for approximately 3.5 weeks. Samples 5 through 8 had no integrity at that time, while Samples 1 through 4, containing tin catalyst, cured to an elastomer. Samples of each mixture were spread into a sheet one month after they were mixed. The sheets were allowed to dry for 10 days and then cut into test pieces and tested with the results shown in Table II.

A caulking material having very good adhesion to both glass and to aluminum was produced by adding 3-(2-aminoethylamino)propyltrimethoxysilane (Samples 3 and 4) to the composition of Samples 1 and 2. Adhesion test samples were prepared by a procedure based upon ASTM D 903. Pieces of glass and aluminum were solvent cleaned, then coated with a 1.6 mm thick layer of the sample caulking material. An aluminum screen was placed over the layer of caulking material and an additional 1.6 mm layer of caulking material was coated over the screen. The test laminate was then cured for approximately 7 weeks at 25° C. and 50 percent relative humidity. The adhesion was evaluated by cutting a 25.4 mm wide strip the length of the panel through the caulking material and screen down to the glass or aluminum substrate. The reinforced caulking material was then cut loose from the substrate for a length of about 25 mm. This tab was bent back 180° and the sample was placed in a tensile test machine. The 25.4 mm wide strip was then pulled off the substrate at a rate of 50 mm per minute. The load required to peel the strip was recorded. The sample was visually checked to determine the type of adhesion failure. If the substrate was clean of caulking material, the cohesive failure (CF) was recorded as 0 percent. If the substrate was completely covered with caulking material (failure was within the caulking material), failure was recorded as 100 percent cohesive failure. On occasion where the failure was between the caulking material and the screen, note of "screen failure" was made. This means that the adhesion to the substrate is some value greater than that recorded, but the true value is unknown. The relative amount of each type of failure in a given sample was noted. Another type of failure can be seen when there is no caulking material left on the substrate, but a film is present over the surface of the substrate. This indicates some cohesive adhesion to the substrate, but failure of the sample at the interface between the caulking material and the substrate. There was a considerable increase in durometer and loss of elongation with Samples 3 and 4. Samples 5 through 8 were made with the amine functional silane present, but not the tin containing catalyst. These samples had low durometer, tensile strength, and elongation properties.

EXAMPLE 5

A series of compositions were prepared using different levels of dialkyltindicarboxylate and vinyltrimethoxysilane to show the effect. A composition was also prepared using ethyltrimethoxysilane as the crosslinker.

The compositions were prepared by mixing 150 parts of the polydimethylsiloxane emulsion of Example 1, 0.26 part of an antifoam, the parts of either vinyltrimethoxysilane or ethyltrimethoxysilane shown in Table III, the amount of 50% aqueous emulsion of dioctyltindilaurate shown in Table III, and 146 parts of the finely ground calcium carbonate of Example 1.

After thorough mixing, samples of each emulsion were laid out as sheets and allowed to dry for one week. Samples 1 and 4 did not cure, they were tacky materials; Samples 2, 3, and 5 had cured to elastomers. After approximately 2 weeks' storage in polyethylene tubes, sheets of emulsion were prepared. After 16 days cure the sheets were cut into samples and tested for physical properties. The results are shown in Table III.

TABLE III

| Sample | Crosslinker | Parts | Catalyst Parts | Durometer | Tensile Strength MPa | Elongation % | Tear Strength kN/m |
|---|---|---|---|---|---|---|---|
| 1* | VTM | 1.48 | 0.1 | not cured | | | |
| 2 | VTM | 1.48 | 1.0 | 20 | 1.01 | 975 | 4.7 |
| 3 | VTM | 1.48 | 0.44 | 18 | 0.87 | 1278 | 5.8 |
| 4* | VTM | 7.4 | 0.44 | not cured | | | |
| 5 | ETM | 1.48 | 0.44 | 16 | 0.81 | 1204 | 5.1 |

VTM = vinyltrimethoxysilane
ETM = ethyltrimethoxysilane
* = comparative examples

EXAMPLE 6

A caulking material was prepared using a different adhesion additive by mixing 150 parts of the polydimethylsiloxane emulsion of Example 1, 0.26 part of antifoam, 0.4 part of vinyltrimethoxysilane, 0.44 part of 50 percent emulsion of dioctyltindilaurate, and 0.36 part of a mixture of 50 percent 2-methyl-3(2-aminoethylamino)propyl(methyl)dimethoxysilane in water. After these were uniformly mixed, 141 parts of the finely ground calcium carbonate of Example 1 was mixed in and stirred at high speed until the filler was wet out and the mixture was uniform. The mixture was of a paste viscosity.

TABLE II

| Sample | Crosslinker | Parts | Catalyst Parts | Adhesion Additive Parts | Durometer | Tensile Strength MPa | Elongation | 180° Peel Strength Aluminum kN/m | % CF | Glass kN/m | % CF |
|---|---|---|---|---|---|---|---|---|---|---|---|
| 1 | VTM | 0.37 | 0.44 | — | 13 | 0.85 | 1235 | 0.26 | 0 | 0.93 | 0 |
| 2 | MTM | 0.34 | 0.44 | — | 11 | 0.72 | 1285 | 0.42 | 0 | 1.14 | 0 |
| 3 | VTM | 0.37 | 0.44 | 0.11 | 28 | 0.87 | 706 | 5.18 | ** | 4.32 | 80** |
| 4 | MTM | 0.34 | 0.44 | 0.11 | 27 | 1.01 | 970 | 5.74 | *** | 5.88 | 50** |
| 5* | VTM | 0.74 | — | 0.22 | 18 | 0.50 | 214 | 1.26 | ** | 0.40 | 0 |
| 6* | VTM | 0.37 | — | 0.22 | 8 | 0.22 | 87 | 0.65 | 10 | 0.30 | 0 |
| 7* | MTM | 0.68 | — | 0.22 | 14 | 0.35 | 111 | 0.38 | Film on surface | 0.28 | 0 |
| 8* | MTM | 0.34 | — | 0.22 | 8 | 0.21 | 67 | 0.42 | Film on surface | 0.23 | 0 |

VTM = vinyltrimethoxysilane
MTM = methyltrimethoxysilane
* = comparative examples
Adhesion Additive = 3-(2-aminoethylamino)propyltrimethoxysilane
** = failed at screen
*** = 50% adhesive failure, 50% screen failure A control mixture was prepared in the same manner except the 2-methyl-3(2-aminoethylamino)propyl(methyl)dimethoxysilane was omitted.

Samples of each mixture was spread into sheets immediately after mixing and were allowed to dry for 7 days at room temperature. The sheets were cut into test pieces and tested with the results shown in Table IV using the methods of test described above. The use of the adhesion additive produced a slightly harder cured material with much better adhesion, particularly to glass and aluminum. The caulking material with the adhesion additive showed 100 percent cohesive failure to glass. All the other failures were adhesive-type failures.

TABLE IV

|  | Control | With Adhesion Additive |
|---|---|---|
| Durometer | 16 | 28 |
| Tensile Strength, MPa | 0.8 | 1.0 |
| Elongation, percent | 1317 | 1169 |
| Adhesion, | | |
| glass, 180° Peel, kN/m | 1.6 | 5.8 |
| aluminum | 0.3 | 5.3 |
| concrete | 1.0 | 1.1 |
| pine | 1.0 | 1.8 |

That which is claimed is:

1. A silicone composition consisting essentially of the aqueous emulsion obtained by mixing
   (A) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms per radical or 2-(perfluoroalkyl)ethyl radicals having less than 7 carbon atoms per radical, present as an emulsion of dispersed particles in water, the emulsion having a pH of greater than 9 and a solids content of greater than 50% by weight,
   (B) from 0.075 to 0.75 part by weight of dialkyltindicarboxylate,
   (C) from 0.2 to 5 parts by weight of silane of the formula RSi(OR')$_3$ where R is a monovalent hydrocarbon radical of from 1 to 4 carbon atoms inclusive and R' is a lower alkyl radical of from 1 to 4 carbon atoms inclusive or a radical of the formula —N=CR$_2$ where R is as defined above and,
   (D) from 50 to 200 parts by weight of inert, non-siliceous filler, to produce a paste-type emulsion having a total solids content of greater than 70% by weight and being useful as caulking material that cures upon removal of the water to an elastomer.
2. The composition of claim 1 in which the polydiorganosiloxane is a polydimethylsiloxane having a weight average molecular weight in the range of from 200,000 to 700,000.
3. The composition of claim 1 in which the dialkyltindicarboxylate is selected from the group consisting of dibutyltindiacetate, dibutyltindilaurate, and dioctyltindilaurate, in an amount of from 0.2 to 0.4 part by weight per 100 parts by weight of polydiorganosiloxane.
4. The composition of claim 1 in which the silane is selected from the group consisting of methyltrimethoxysilane, vinyltrimethoxysilane, and methyltri(ethylmethyloximo)silane is an amount of from 0.4 to 2 parts by weight per 100 parts by weight of polydiorganosiloxane.
5. The composition of claim 1 in which the filler is selected from the group consisting of aluminum oxide, titanium dioxide, zinc oxide, and calcium carbonate, has an average particle size of less than 5 micrometers, and is present in an amount of from 125 to 175 parts by weight per 100 parts by weight of polydiorganosiloxane.
6. The composition of claim 2 in which the dialkyltindicarboxylate is dioctyltindilaurate or dibutyltindilaurate in an amount of from 0.2 to 0.4 part by weight, the silane is methyltrimethoxysilane or vinyltrimethoxysilane in an amount of from 0.4 to 2 parts by weight, and the filler is calcium carbonate having an average particle size of less than 2 micrometers.
7. The composition of claim 1 which also includes (E) from 0.05 to 0.25 part by weight of aminoalkoxysilane of the formula

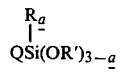

where Q is an amine functional group consisting of R$^2{}_b$H$_{2-b}$NR$^3$— and R$^2{}_b$H$_{2-b}$N(CH$_2$)$_2$NHR$^3$— in which R$^2$ is a monvalent hydrocarbon radical of from 1 to 10 carbon atoms, R$^3$ is —(CH$_2$)$_3$— or CH$_2$CH(CH$_3$)CH$_2$—, and b is an integer from 0 to 2, R is an alkyl group of from 1 to 4 carbons, R' is as defined above, and a is 0 or 1.
8. The composition of claim 7 in which the aminoalkoxysilane is present in an amount of from 0.05 to 0.125 part by weight.
9. The composition of claim 7 in which the aminoalkoxysilane is 3-(2-aminoethylamino)propyltrimethoxysilane.
10. The composition of claim 7 in which the aminoalkoxysilane is aminopropyltriethoxysilane.
11. The composition of claim 7 in which the aminoalkoxysilane is 3-(2-aminoethylamino)butyl(methyl)dimethoxysilane.
12. The composition of claim 7 in which the aminoalkoxysilane is 2-methyl-3(2-aminoethylamino)propyl(methyl)dimethoxysilane.

* * * * *